United States Patent [19]
Brock et al.

[11] Patent Number: 5,626,917
[45] Date of Patent: May 6, 1997

[54] PROCESS FOR THE MULTI-LAYER LACQUER COATING OF SUBSTRATES

[75] Inventors: Thomas Brock, Hurth; Erwin Wilczek, Cologne, both of Germany

[73] Assignee: Herberts GmbH, Wuppertal, Germany

[21] Appl. No.: 374,538

[22] PCT Filed: May 25, 1994

[86] PCT No.: PCT/EP94/01675

§ 371 Date: Mar. 14, 1995

§ 102(e) Date: Mar. 14, 1995

[87] PCT Pub. No.: WO94/28076

PCT Pub. Date: Dec. 8, 1994

[30] Foreign Application Priority Data

May 28, 1993 [DE] Germany .................. 43 17 861.8

[51] Int. Cl.⁶ .................. B05D 1/36; B05D 7/16
[52] U.S. Cl. .................. 427/407.1; 427/410
[58] Field of Search .................. 427/409, 407.1, 427/410

[56] References Cited

U.S. PATENT DOCUMENTS

| | | | |
|---|---|---|---|
| 4,177,183 | 12/1979 | Dalibor | 525/193 |
| 4,195,004 | 3/1980 | Van Acker et al. | 525/384 |
| 4,532,300 | 7/1985 | Lenz et al. | 525/123 |
| 4,555,535 | 11/1985 | Bednarek et al. | 525/123 |
| 4,731,290 | 3/1988 | Chang | 427/409 |
| 4,741,932 | 5/1988 | Ichimura et al. | 427/407.1 |
| 4,909,915 | 3/1990 | Bederke et al. | 204/181.4 |
| 4,978,708 | 12/1990 | Fowler et al. | 427/409 |
| 5,055,514 | 10/1991 | Kumada et al. | 525/127 |
| 5,322,897 | 6/1994 | Jung et al. | 525/123 |

FOREIGN PATENT DOCUMENTS

| | | |
|---|---|---|
| 0320719A1 | 6/1989 | European Pat. Off. . |
| 0439021A2 | 7/1991 | European Pat. Off. . |
| WO92/02590 | 7/1991 | WIPO . |

*Primary Examiner*—Diana Dudash
*Attorney, Agent, or Firm*—Keck, Mahin & Cate

[57] ABSTRACT

A process is described for the multi-layer lacquer coating of a substrate by applying a base lacquer layer of an aqueous coating composition onto the optionally precoated substrate and subsequently overcoating with a clear lacquer, which contains:

A) at least one copolymer containing hydroxyl groups which is obtainable by reacting
 a) one or more esters of aliphatic saturated monocarboxylic acids branched in $\alpha$-position with one or more epoxide groups in the alcohol portion with
 b) one or more alkyl esters of $\alpha$, $\beta$-ethylenically unsaturated carboxylic acids,
 c) one or more hydroxyalkyl esters of $\alpha$, $\beta$-ethylenically unsaturated carboxylic acids,
 d) optionally one or more $\alpha$, $\beta$-ethylenically unsaturated carboxylic acids and
 e) optionally one or more vinyl monomers differing from a), b), c) and d),
B) one or more polyisocyanates with an average of at least 1.5 NCO groups per molecule in a quantity such that the equivalent ratio of OH groups in component A) to NCO groups of component B) is 1:1.6 to 1:2.2,
C) one or more solvents, optionally together with one or more customary lacquer additives.

22 Claims, No Drawings

PROCESS FOR THE MULTI-LAYER LACQUER COATING OF SUBSTRATES

FIELD OF THE INVENTION

This invention relates to a process for the multi-layer lacquer coating of substrates, which process may in particular be used in industrial and automotive lacquer coating, preferably in automotive repair lacquer coating.

BACKGROUND OF THE INVENTION

DE-A-41 15 015 and DE-A-41 15 042 describe physically drying water-based coating compositions, in particular for the production of metallic coatings and for the production of plain coloured coatings. The metallic lacquers contain at least one binder based on polyurethanes containing carbonate groups and having a number average molecular weight ($M_n$) of 70,000 to 500,000 and further polyurethanes having an $M_n$ of 20,000 to 60,000. Plain coloured coatings are produced by using binder mixtures based on polyurethanes containing carbonate groups and having a glass transition temperature ($T_g$) of below 0° C. and unsaturated reaction products of carboxy-functional polycondensation products with ethylenically unsaturated monomers having a glass transition temperature of above 0° C.

Thanks to their ability to harden at room temperature or with slight heating, for example to temperatures of up to 60° C., such physically drying coating compositions are particularly suitable for automotive repair lacquer coating. Once applied, they may be coated with transparent topcoat lacquers. Application may be performed wet-on-wet after briefly flashing off or once the base lacquer coat has dried. The clear lacquers used are customary transparent lacquers used in the automotive sector. These are in particular conventional formulations of acrylate/isocyanate-based two-component lacquers.

However, after overcoating with clear lacquer, the hardness of the base lacquer coat in such a multi-layer structure and consequently of the entire topcoat layer has been found to be inadequate. Particularly at elevated coat thicknesses (approx. 40 µm), the base lacquer remains too soft. The gloss and water resistance achieved also remain unsatisfactory.

DE-A-37 31 652 describes a conventional two-component clear lacquer based on an acrylate resin containing hydroxyl, carboxyl and amino groups and a polyisocyanate crosslinking agent, which lacquer is in particular intended for application onto a metallic base coat lacquer. The acrylate resin is obtained by copolymerisation of hydroxyalkyl esters, α, β-unsaturated carboxylic acids with ethylenically unsaturated carboxylic acids and further olefinically unsaturated monomers. The resultant copolymer is further reacted with compounds containing one free isocyanate group and at least one tert.-amino group per molecule. Crosslinking is achieved at an NCO:OH ratio of 0.3:1 to 3.5:1. Only inadequate hardness in a multi-layer structure is obtained with these clear lacquers too.

SUMMARY OF THE INVENTION

The object of the present invention is thus to provide coating compositions which give rise to coatings with elevated gloss, high hardness and good weathering resistance and which in particular retain these properties when used as clear lacquers for overcoating per se known (plain and metallic) water-based base lacquers.

This object is achieved by a process for the multi-layer lacquer coating of a substrate by applying a base lacquer layer of an aqueous coating composition onto the optionally precoated substrate and applying a clear lacquer, which process is characterised in that a clear lacquer is used which contains A) at least one copolymer containing hydroxyl groups obtainable from
 a) one or more esters of aliphatic saturated monocarboxylic acids branched in α-position with one or more epoxide groups or ethylenic double bonds in the alcohol portion,
 b) one or more alkyl esters of α, β-ethylenically unsaturated carboxylic acids and
 c) one or more hydroxyalkyl esters of α, β-ethylenically unsaturated carboxylic acids,
B) one or more polyisocyanates with an average of at least 1.5 NCO groups per molecule in a quantity such that the equivalent ratio of OH groups in component A) to NCO groups of component B) is 1:1.6 to 1:2.2 and
C) one or more solvents, optionally together with customary lacquer additives.

DETAILED DESCRIPTION OF THE PREFERRED EMBODIMENTS

According to a preferred embodiment, component A) may also optionally be produced also using one or more α, β-ethylenically unsaturated carboxylic acids as component d) and/or optionally also using one or more vinyl monomers differing from a), b), c) and d) as component e).

It has been found that when the coating composition according to the invention is applied in transparent form onto a water-based base lacquer, preferably based on a polyurethane resin, very good hardness, particularly at elevated coat thicknesses, together with improved gloss are achieved. Surprisingly, even in the event of excessive crosslinking with isocyanate, there is no discernible deterioration in weathering resistance (water resistance, gloss retention). In known polyisocyanate-crosslinking acrylate resins, deterioration in weathering resistance is often observed even with only slight excess crosslinking.

Component a) for the production of the copolymer containing hydroxyl groups comprises esters of aliphatic saturated monocarboxylic acids branched in α-position with 5 to 20 C atoms, particularly preferably with 9 to 11 C atoms. These may, for example, be monocarboxylic acids in which the carboxyl group is attached to a tertiary or quaternary C atoms. The saturated branched aliphatic monocarboxylic acids are known substances, which may be produced using known processes, for example by reacting formic acid or carbon monoxide and water with olefins in the presence of liquid acidic catalysts, such as sulphuric acid, phosphoric acid, boron trifluoride. Mixtures of saturated aliphatic monocarboxylic acids branched in α-position, which largely consist of acids in which the carboxyl group is attached to a quaternary C atom, are generally obtained according to this process. The olefins may, for example be cracking products of paraffinic hydrocarbons, such as mineral oil fractions and may contain both branched and unbranched acyclic and/or cycloaliphatic olefins. Other olefinic starting materials are, for example, diisobutylene, propylene trimer.

The alcohol component on which the esters are formally based has one or more epoxide groups or ethylenic double bonds. The esters containing epoxide groups (component a1) may be, for example, glycidyl esters. The esters containing ethylenic double bonds (component a2) may, for example, be vinyl esters.

The vinyl esters may be produced in a manner known per se from the acids described above, for example by reacting the acids with acetylene. Vinyl esters of saturated aliphatic monocarboxylic acids with 9 to 11 C atoms per molecule have the advantage that their boiling point is so high that a pressure vessel is not required for the reaction.

The glycidyl esters may, for example, be produced in a customary manner by reacting the corresponding acid with epichlorohydrin. Such vinyl and glycidyl esters are commercially available, for example as VeoVa 9, VeoVa 10, Cardura E (registered trade mark).

Alkyl esters of α, β-unsaturated monocarboxylic acids, such as for example esters of acrylic acid, methacrylic acid, itaconic acid, crotonic acid with unbranched and branched alcohols together with mixtures thereof are preferably used as component b). Acrylic and/or methacrylic acid esters with 2 to 8, again preferably with 3 to 5 C atoms, in the alkyl residue are preferred. Examples of such esters are ethyl (meth)acrylate, propyl (meth)acrylate, isopropyl (meth) acrylate, butyl (meth)acrylate, isobutyl (meth)acrylate, pentyl (meth)acrylate, isopentyl (meth)acrylate, hexyl (meth) acrylate, ethylhexyl (meth)acrylate. Here and below, the term (meth)acrylic means acrylic and/or methacrylic.

Hydroxyalkyl esters of α, β-unsaturated carboxylic acids with primary or secondary hydroxyl groups may, in particular, be considered as component c). Hydroxyalkyl esters of methacrylic acid and/or acrylic acid are preferably used. Hydroxyalkyl esters of acrylic and/or methacrylic acid with 2 to 8 C atoms in the hydroxyalkyl residue are particularly preferred. Examples of such esters are 2-hydroxyethyl (meth)acrylate, 2-hydroxypropyl (meth) acrylate, hydroxybutyl (meth)acrylate, 3-hydroxybutyl (meth)acrylate, hydroxyhexyl (meth)acrylate, hydroxyoctyl (meth)acrylate.

Further ethylenically unsaturated, preferably α, β-ethylenically unsaturated carboxylic acids (component d)) may optionally also be added. Examples of such substances are monocarboxylic acids such as acrylic acid, methacrylic acid, but also di- or polybasic carboxylic acids, such as for example maleic acid, fumaric acid, itaconic acid. Carboxylic acids with 3 to 5 C atoms per molecule are preferred. Acrylic acid and methacrylic acid are particularly preferred.

Other vinyl monomers differing from components a) to d) may optionally also be used as component e). These are preferably monovinyl aromatic compounds with 8 to 9 C atoms per molecule, such as styrene, vinyltoluene, alkyl-substituted styrenes, particularly preferably styrene. Other vinyl monomers, such as for example vinyl acetate, may however also be used.

The copolymers containing hydroxyl groups may be produced using customary polymerisation processes, for example by bulk or solution polymerisation. The polymerisation processes are well known and described, for example, in Houben-Weyl, Methoden der organischen Chemie, 4th edition, volume 14/1, pages 24–255 (1961). The solution polymerisation process is preferred for production of the copolymer containing hydroxyl groups. In this process, the solvent and component a) are, for example, introduced into the reaction vessel, heated to boiling point while being stirred and the mixture of monomers and initiator continuously apportioned within a certain period. Polymerisation is, for example, performed at elevated temperatures, for example of 100° C. to 160° C., preferably at 130° to 150° C.

The polymerisation reaction is initiated with polymerisation initiators. Customary initiators which decompose thermally in a first order reaction to yield free radicals, for example peroxides, are suitable. The type and quantity of initiator are preferably selected such that the most constant possible supply of radicals is present during a possible feed phase. Initiators which are preferably used for polymerisation are: dialkyl peroxides, such as di-tert.-butyl peroxide, dicumyl peroxide, hydroperoxides, such as cumene hydroperoxide, tert.-butyl hydroperoxide, peresters, such as tert.-butyl perbenzoate, tert.-butyl per-3,4,4-trimethylhexanoate, tert.-butyl per-2-ethylhexanoate. The polymerisation initiators, in particular di-tert.-butyl peroxide and tert.-butyl perbenzoate, are preferably added in a quantity of 0.1 to 2.0 wt. %, related to the weight of monomers. Customary chain transfer agents may also be used to control molecular weight. Examples thereof are mercaptans, thioglycolic acid esters, chlorinated hydrocarbons.

The monomers are preferably used in a quantity ratio of 4 to 20 wt. % of glycidyl esters of aliphatic saturated monocarboxylic acids branched in α-position (a1) and/or esters of aliphatic saturated monocarboxylic acids branched in α-position with unsaturated alcohols (a2), 20 to 70 wt. % of alkyl esters of ethylenically unsaturated carboxylic acids (b), 10 to 60 wt. % of hydroxyalkyl esters of ethylenically unsaturated carboxylic acids (c), up to 20 wt. %, for example 9 to 20 wt. %, of ethylenically unsaturated carboxylic acids (d) and 0 to 30 wt. % of further vinyl monomers (e), wherein the sum of the quantities of the individual components always amounts to 100%.

Polymerisation conditions are preferably adjusted such that the resultant copolymers have a weight average molecular weight ($M_w$) of 2,000 to 10,000. The hydroxyl value of the copolymer is preferably 80 to 200 mg KOH/g, particularly preferably 100 to 150 m/g KOH/g, and the acid value preferably 5 to 100 m/g KOH/g, preferably 20 to 50 mg KOH/g. Customary inert solvents may be used as the solvent for solution polymerisation. Such organic solvents which are subsequently also used in the finished coating composition are preferably suitable. Examples of such solvents are esters such as butyl acetate, isobutyl acetate; ketones, such as methyl ethyl ketone, diisobutyl ketone, cyclohexanone, isophorone; aromatic hydrocarbons, such as xylene, Solvesso 100 (registered trade mark for aromatic hydrocarbon mixtures) and aliphatic hydrocarbons may also be used.

In addition to the copolymers containing hydroxyl groups described above, the binder may contain further hydroxy-functional resins. Such additional resins are preferably added in quantities of less than 15 wt. %, particularly preferably of less than 10 wt. %, related to the total weight of component A). Resins which may be used are, for example, polyesters with a number average molecular weight ($M_n$) of 500 to 10,000 and/or polyurethane resins with an $M_n$ of 1,000 to 100,000. If the additional resins also contain hydroxyl groups, these must be taken into account when adjusting the OH:NCO crosslinking ratio.

The polyisocyanate component B) comprises any desired di- or polyfunctional organic polyisocyanates with aliphatically, cycloaliphatically, araliphatically and/or aromatically attached free isocyanate groups which are liquid at room temperature. The polyisocyanate component B) preferably has a viscosity of 1 to 6,000 mPa·s, preferably above 5 and below 3,000 mPa·s, at 23° C. The polyisocyanate component preferably comprises polyisocyanates or polyisocyanate mixtures with exclusively aliphatically and/or cycloaliphatically attached isocyanate groups with an average NCO functionality of 1.5 to 5, preferably of 2 to 3.

Highly suitable as the polyisocyanate component are, for example, customary lacquer polyisocyanates based on hexamethylene diisocyanate, 1-isocyanato-3,3,5-trimethyl-5-isocyanatomethylcyclohexane (IPDI) and/or bis (isocyanatocyclohexyl)methane and the per se known derivatives of these diisocyanates which contain biuret, urethanedione and/or isocyanurate groups, from which excess starting diisocyanate has been eliminated after production, for example by distillation, to a residual content of less than 0.5 wt. %. Such compounds include, for example, polyisocyanates having biuret groups based on hexamethylene diisocyanate, which consist of mixtures of N,N',N"-tris-(6-isocyanatohexyl)biuret with subordinate quantities of the higher homologues thereof, together with the cyclic trimerisation products of hexamethylene diisocyanate, which substantially consist of N,N',N"-tris-(6-isocyanatohexyl)-isocyanurate mixed with subordinate quantities of the higher homologues thereof. In particular, mixtures of uretidione and/or hexamethylene diisocyanate, as are produced by catalytic oligomerisation of hexamethylene diisocyanate using trialkyl phosphines, are preferred.

Sterically hindered polyisocyanates which have one or two linear, branched or cyclic alkyl substituents in α-position relative to the isocyanate groups are also highly suitable. Examples of such compounds are 1,1,6,6-tetramethylhexamethylene diisocyanate, 1,5-dibutylpentamethylene diisocyanate, p- or m-tetramethylenexylylene diisocyanate and the corresponding hydrogenated homologues. These diisocyanates may also be suitably reacted to yield more highly functional compounds, for example by trimerisation or by reaction with trimethylolpropane.

The aromatic polyisocyanates, which are suitable, but less preferred, according to the invention, are in particular customary so-called "lacquer polyisocyanates" based on 2,4-diisocyanatotoluene or technical mixtures thereof with 2,6-diisocyanatotoluene or based on 4,4'-diisocyanatodiphenylmethane or the mixtures thereof with its isomers or higher homologues. Such aromatic lacquer polyisocyanates are, for example, the isocyanates containing urethane groups as are obtained by reacting excess quantities of 2,4-diisocyanatotoluene with polyhydric alcohols such as trimethylolpropone and subsequent elimination of the excess diisocyanate by distillation. Further aromatic lacquer polyisocyanates are, for example, the trimerisation products of the monomeric diisocyanates cited by way of example, i.e. the corresponding isocyanatoisocyanurates, from which the starting compounds have also been eliminated after production, preferably by distillation.

The polyisocyanates may also be used in the form of isocyanate-modified resins. The isocyanate compounds used for incorporation into resin-like parent substances are, for example, those containing two NCO groups of differing reactivities, such as for example m- or p-dimethyltoluene diisocyanate (or 2-isocyanato-2-(4-isocyanatophenyl) propane) or those which contain in addition to a sterically hindered isocyanate group a free-radically polymerisable double bond, such as for example m- or p-isopropenyl-dimethylbenzyl isocyanate. Using these reactive components, it is possible to produce crosslinking agents containing isocyanate groups and having a higher molecular weight and functionality either by the reaction of the OH groups of polyesters or polyurethanes with one of the isocyanate groups, in particular with the more reactive NCO group or by polymerisation of the double bond in suitable polymer resins.

The polyisocyanate component may also consist of mixtures of the di- and polyisocyanates cited by way of example.

Coating compositions are produced from the copolymer A) containing hydroxyl groups and the polyisocyanate B).

Production is performed such that the OH:NCO equivalent ratio is 1:1.6 to 1:2.2, preferably 1:1.7 to 1:2.0.

Transparent, pigment-free coating compositions (clear lacquers) are preferably produced. The finished clear lacquers may contain auxiliaries and additives known from polyurethane lacquer technology as additives. These are, for example, levelling agents based on cellulose esters, oligoalkyl acrylates and silicone oils, colourless pigments, additives controlling viscosity and rheology, flatting and anti-foaming agents, UV absorbers and light stabilisers. The clear lacquer additionally contains solvents to establish the spraying viscosity, as were for example defined for production of component A), for example butyl acetate, glycol ether esters, such as methoxypropyl acetate, aromatic hydrocarbons, such as for example xylene, Solvesso, ketones, such as methyl ethyl ketone or cyclohexanone.

The lacquer may optionally also contain a crosslinking catalyst for urethane formation. Amines, for example dimethylethanolamine, are preferably used to this end. Further suitable catalysts are organotin and organozinc compounds together with other heavy metal accelerators.

Additives and auxiliaries are added in customary quantities familiar to the person skilled in the art, depending upon the desired effect. They are dispersed or dissolved in one of the components. No reactions should occur between the individual constituents during this operation.

In order to produce the coating composition in ready-to-use form, the components of the coating composition are mixed together in the desired proportions and the viscosity optionally adjusted.

The coating composition may be applied as a clear lacquer as customary in multi-layer lacquer coating, for example wet-on-wet onto the water-based base lacquer once this has briefly flashed-off or dried. The coating composition may be applied onto the surface to be lacquered using customary methods such as dipping, spraying, rolling, knife-coating, brushing. The organic solvents evaporate during or after application onto the substrate.

Hardening preferably proceeds at 10° to 80° C., particularly preferably at room temperature to 60° C. Hardening time is inter alia dependent upon the temperature and the optionally used catalyst. The time may range, for example, from a few minutes to up to 30 days. If the time is too long, it may be shortened by increasing the temperature. Flow-out is also optionally promoted by an elevated temperature. Hardening may also be accelerated by IR drying.

The coating compositions are formulated as clear lacquers and used for overcoating water-based base lacquers, in particular wet-on-wet. The water-based base lacquers which may be used are per se known metallic, pearlescent or plain water-based base lacquers based, for example, on polyurethane, polyester and/or polyacrylate. Polyurethane-based lacquers are preferably used. Preferred polyurethane metallic base lacquers contain 8 to 30 wt. % of a binder or binder mixture based on one or more polyurethanes containing carbonate groups and having a number average molecular weight ($M_n$) of 70,000 to 500,000 and optionally further polyurethanes with an $M_n$ of 20,000 to 60,000. The polyurethanes with an $M_n$ of 70,000 to 500,000 may, for example, comprise 50 to 90 wt. %, and the polyurethanes with an $M_n$ of 20,000 to 60,000 may comprise 10 to 50 wt. %, in each case in the form of aqueous dispersions. Such polyurethanes, the production and use thereof in water-based base lacquers are exhaustively described in DE-A-41 15 042.

Plain coloured coatings are in particular produced from 5 to 30 wt. % of a binder or binder mixture based on one or more polyurethanes containing carbonate groups with a glass transition temperature of below 0° C. and unsaturated reaction products of carboxy-functional polycondensation products with ethylenically unsaturated monomers with a glass transition temperature of above 0° C. For example, the polyurethanes with the glass transition temperature of below 0° C. may comprise 50 to 90 wt. % and the polyurethanes with the glass transition temperature of above 0° C. may comprise 10 to 50 wt. %, each in the form of aqueous dispersions. The wt. % relate here to the binder solids content and total 100%. Such polyurethanes, the production and use thereof in water-based base lacquers are exhaustively described in DE-A-41 15 042 from the same applicant.

Further water-based binders which may readily be used for the stated water-based base lacquers are, for example, mixtures of A) 5 to 50 wt. % of one or more polyurethanes containing carbonate groups with a number average molecular weight ($M_n$) of 70,000 to 500,000, in the form of an aqueous dispersion, obtainable by reacting
   a) 10 to 40 wt. % of one or more organic polyisocyanates which have no groups which are hydrophilic or may be converted into hydrophilic groups,
   b) 40 to 80 wt. % of one or more relatively high molecular weight organic polyhydroxyl compounds, which have no groups which are hydrophilic or may be converted in hydrophilic groups, and at least 50 wt. % of which consist of one or more polyhydroxy polycarbonates,
   c) 0.2 to 18 wt. % of one or more low molecular weight compounds which have at least two groups reactive with isocyanate groups, but no groups which are hydrophilic or may be converted into hydrophilic groups,
   d) 1 to 12 Wt.% Of one or more compounds which, in addition to at least one ionic group or at least one group which may be converted into an ionic group, have at least one hydrogen atom reactive with isocyanate groups and
   e) 0 to 8 wt. % of one or more non-ionic hydrophilic compounds, which have at least one isocyanate group or at least one group reactive with isocyanate groups and B) 50 to 95 wt. % of one or more polyurethanes with a number average molecular weight ($M_n$) of 30,000 to 500,000, in the form of an aqueous dispersion,
   obtainable by free-radically initiated polymerisation of one or more polyurethane macromonomers containing carboxyl, phosphonic acid and/or sulphonic acid groups and lateral vinyl groups in the presence of one or more unsaturated monomers copolymerisable with the polyurethane macromonomer,
wherein the wt. % of components A) and B) each relate to the binder solids content and total 100 wt. %. Such binders are, for example, described in DE-A-43 39 085.

Mixtures as described in DE-A-43 44 063 are, for example, also well suited as water-borne binders for the stated water-based base lacquers. They consist of:

A) 45 to 95 wt. % of one or more polyurethanes obtainable by free-radically initiated polymerisation of polyurethane macromonomers containing carboxyl, phosphonic and/or sulphonic acid groups and lateral vinyl groups, optionally together with terminal vinyl, hydroxyl, urethane, thiourethane and/or urea groups in the presence of one of more unsaturated monomers copolymerisable with the polyurethane macromonomer, in the form of an aqueous dispersion and B) 5 to 55 wt. % of one or more polyurethane resins containing ionic groups but neither urea nor carbonate groups and with a number average molecular weight ($M_n$) of 10,000 to 300,000 and an acid value of 5 to 50 in the form of an aqueous dispersion, obtainable by preparing a polyurethane prepolymer containing OH groups with an OH value to 5 to 75 and a number average molecular weight ($M_n$) of 5,000 to 50,000 by reacting in an organic medium
   a) one or more isocyanate-reactive compounds with an acid value of 0 to 10 in the form of
      a1) 70 to 100 wt. % of one or more polyester polyols and/or polyether polyols, in particular polyester diols and/or polyether diols with a molecular weight of 500 to 6,000, together with
      a2) 30 to 0 wt. % of one or more compounds differing from a1) with at least two isocyanate-reactive groups, with a molecular weight of 60 to 400 with
   b) one or more reaction products containing free isocyanate groups prepared from
      b1) at least one compound with two isocyanate-reactive groups and at least one anionic group or group capable of forming anions and
      b2) one or more organic diisocyanates
   in a quantity ratio such that the molar ratio of the isocyanate-reactive groups of b1) to the isocyanate groups of b2) is 1:1.5 to 1:2.5, wherein the reaction product b) may be produced in the presence of component a), wherein component b) is used in such a quantity that the finished polyurethane resins have the desired acid value, together with
   c) one or more polyisocyanates with at least two free isocyanate groups per molecule in a quantity such that the molar ratio of the OH groups of component a) to the NCO groups of component b) and c) is 1.01:1 to 3:1, whereupon the prepolymer obtained from a), b) and c) is chain extended before or after partial or complete neutralisation of any groups present which may be converted into ionic groups in the organic medium or after conversion into the aqueous phase by reaction with
   d) one or more polyfunctional isocyanates with a free NCO group functionality of at least 1.8, in proportions such that the finished polyurethane resins have the desired number average molecular weight, wherein the wt. % of components A) and B) each relate to the resin solids content.

The plain or metallic coloured water-based base lacquer compositions based on the polyurethanes described above contain, for example, in addition to the binder fraction of 8 to 30 wt. %, 50 to 85 wt. % of water, 1 to 20 wt. % of one or more solvents, for example alcohols, such as butanol, glycol ethers, such as ethylene glycol monobutyl ether, aromatic hydrocarbons, such as Solvesso, methoxypropyl acetate and 0.3 to 25 wt. % of pigments.

The pigments may be opaque, transparent or effect pigments. The formulation of a metallic base lacquer preferably contains 0.3 to 4 wt. % of one or more metal pigments and 0 to 10 wt. % of one or more coloured or effect pigments. The formulation of plain base lacquers preferably contains 5 to 20 wt. % of pigments.

Water-based base lacquers contain neutralising agents for the partial neutralisation of neutralisable groups. The degree of neutralisation of neutralisable groups is preferably 40 to 120% of the neutralisable groups and is in particular less than 100%. Neutralising agents which may be considered are bases customary in the lacquer sector, such as ammonia, alkanolamines, such as N,N-dimethylethanolamine or tert.-amines, such as triethylamine, triethanolamine, N-methylmorpholine.

The water-based base lacquers optionally also contain customary additives and auxiliary substances as are used in the lacquer sector. Such auxiliary substances and additives are, for example, thickeners, rheology-controlling additives, anti-foaming agents, corrosion inhibitors (for example to inhibit gassing of metal pigments). The additives and auxiliary substances are added in customary quantities familiar to the person skilled in the art.

When applied according to the invention onto known water-based base lacquers, the coating composition according to the invention produces multi-layer lacquer coatings with very good hardness and excellent gloss. A comparison with customary clear lacquer with an OH:NCO crosslinking ratio of 1:1 showed very unsatisfactory hardness and defective gloss. Surprisingly, despite excess crosslinking, no impairment of weathering stability was observed. Comparably good results for the total structure are achieved as are achieved with conventional, solvent-based lacquers.

The process according to the invention is, for example, applied in industrial and automotive lacquer coating for metals and plastics. It is preferably used in automotive repair lacquer coating and for initial lacquer coating of vehicles or vehicle components, in particular for utility vehicles, with room-temperature or forced drying.

The following examples and comparative examples are intended to illustrate the invention in greater detail.

EXAMPLE 1

Production of the Copolymer Containing Hydroxyl Groups 750 g of a mixture of aromatic hydrocarbons, registered trade mark Solvesso 100 and 175 g of a customary commercial vinyl ester, registered trade mark Veova 10, were introduced into a 2 litre, three-necked flask with ground joints fitted with a stirrer, contact thermometer, bulb condenser and dropping funnel and heated to 147° C. while being stirred and refluxed. Over a period of 5 hours, the monomer/initiator mixture prepared from 50 g of acrylic acid, 105 g of butyl methacrylate, 250 g of isobutyl methacrylate, 425 g of tert.-butyl acrylate, 550 g of hydroxypropyl methacrylate and 70 g of di-tert.-butyl peroxide is continuously apportioned from the dropping funnel. Towards the end of the feed period, the dropping funnel is rinsed with 125 g of Solvesso 100 and this is added to the reaction mixture. The batch is then post polymerised for 6 hours at 143° C. such that conversion proceeds to greater than 99%.

The copolymer has a solids content of 67%, an acid value of 31 mg KOH/g, an OH value of 132 mg KOH/g and a viscosity of 4110 mPa·s, measured at 25°0 C.

EXAMPLE 2

Production of a Clear Lacquer 55 wt. % Of copolymer containing hydroxyl groups
34 wt. % of butyl acetate
10 wt. % of a mixture of aromatic hydrocarbons, registered trade mark Solvesso 100
1 wt. % of light stabiliser
0.005 wt. % of 10% dibutyltin dilaurate solution A clear lacquer is produced with a solids content of 55% and a viscosity of approximately 90 s (DIN cup, 4 mm nozzle, 23° C.).

A polyisocyanate hardener is them prepared by mixing the following constituents:

35 parts by wt. of a customary commercial polyisocyanate, registered trade mark Desmodur 3390
53 parts by wt. of butyl acetate
7 parts by wt. of methoxypropyl acetate
5 parts by wt. of a mixture of aromatic hydrocarbons, registered trade mark Solvesso 100

The two components are mixed together shortly before application in a ratio such that the NCO:OH equivalent ratio is 2:1.

EXAMPLE 3

Production of a Clear Lacquer

A method similar to that used in example 2 is used. However, at variance with example 2, the component containing hydroxyl groups and the polyisocyanate component are mixed in an NCO:OH equivalent ratio of 1.7:1.

Comparative Test

A method similar to that used in example 2 is used. However, the component containing hydroxyl groups and the polyisocyanate component are mixed in an NCO:OH equivalent ratio of 1:1.

EXAMPLE 4

Metallic water-based base lacquers based on polyurethane (production of polyurethane dispersion as described in DE-A-41 15 015, production example 1, and production of metallic water-based base lacquers, production example 3) are applied to bright-polished bodywork sheet metal with a customary 2 component epoxy keying primer and customary 2 component polyurethane filler. Water-based primers and fillers may also be used.

Comparison Test (comparison application)

Customary conventional base lacquers based on cellulose acetobutyrate/acrylate are applied in a similar manner to example 4. After 15 minutes' pre-drying, the clear lacquer produced in the comparison test is applied. After flashing off for 10 minutes at room temperature, the coating is dried for 45 minutes at 60° C.

After 20 to 40 minutes' pre-drying at room temperature, the clear lacquers produced in examples 2 and 3 and in the comparison test are each applied. After 10 minute's flashing off at room temperature, the coating is dried for 45 minutes at 60° C.

The properties of the resultant lacquer coatings in terms of gloss, hardness and weathering stability are shown in the following table.

| | Coat thickness: 30 to 40 μm | | | | |
|---|---|---|---|---|---|
| | Clear lacquer cross- | | | Water resistance[1] | |
| Base lacquer | linking stoichiometry OH:NCO | Scratch resistance | Surface smoothness | Swelling | Blistering[2] Quantity/size |
| Solvent-based comparison | 1:1 | 1 | 1 | 1 | 0/0 |
| Water-borne comparison | 1:1 | 3 | 3 | 2–3 | 2/2 |

-continued

Coat thickness: 30 to 40 μm

| Base lacquer | Clear lacquer cross-linking stoichiometry OH:NCO | Scratch resistance | Surface smoothness | Water resistance[1] Swelling | Blistering[2] Quantity/size |
|---|---|---|---|---|---|
| Waterborne example 3 | 1:1.7 | 2 | 2 | 2 | 1/1 |
| Waterborne example 2 | 1:2 | 1–2 | 1 | 1–2 | 0/0 |

[1] Moist/heat test to DIN 50017 KK
[2] To DIN 53209
Marks:
1 = very good
2 = good
3 = usable under certain circumstances
4 = unusable It may be seen from the comparison that approximately equally good results are achieved in a multi-layer structure with the process according to the invention on a water-based base lacquer as on customary conventional base lacquers. Good results in terms of hardness and water resistance are in particular achieved with thick coats of the water-based base lacquer (30 to 40 μm).

We claim:

1. Process for the multi-layer lacquer coating of a substrate by applying a base lacquer layer of an aqueous coating composition onto an optionally precoated substrate and subsequently overcoating with a clear lacquer, which process is characterised in that a clear lacquer is used which contains:
   A) at least one copolymer containing hydroxyl groups which is obtained by reacting
      a) one or more esters of aliphatic saturated monocarboxylic acids branched in α-position with one or more epoxide groups in the alcohol portion with
      b) one or more alkyl esters of α, β-ethylenically unsaturated carboxylic acids, and
      c) one or more hydroxyalkyl esters of α, βB-ethylenically unsaturated carboxylic acids, and
   B) one or more polyisocyanates with an average of at least 1.5 NCO groups per molecule in a quantity such that the equivalent ratio of OH groups in component A) to NCO groups of component B) is 1:1.6 to 1:2.2,
   C) one or more solvents.

2. Process according to claim 1, characterised in that the copolymer A) containing hydroxyl groups is obtained by reacting a), b), c) and one or more α, β-ethylenically unsaturated carboxylic acids d).

3. Process according to claim 1, characterised in that the copolymer A) containing hydroxyl groups is obtained by reacting a), b), c), optionally one or more α, β-ethylenically unsatured carboxylic acids d) and optionally one or more vinyl monomers e) differing from a), b), c) and d).

4. Process according to claim 1, characterised in that the aqueous base lacquer is applied onto the optionally precoated substrate and the clear lacquer is applied wet-on-wet onto the resultant base lacquer layer, optionally after flashing off, and the resultant layers are subsequently hardened together.

5. Process according to claim 1, characterised in that a clear lacquer is used which contains component A) and component B) in a quantity such that the equivalent ratio of the OH groups to the NCO groups is 1:1.7 to 1:2.0.

6. Process according to claim 3 characterised in that a clear lacquer is used in which, on production of component A), the monomer a) is used in a quantity of 4 to 20 wt. % of all the monomers constituting component A).

7. Process according to claim 1, characterised in that a clear lacquer is used in which the monomer a) of component A) comprises one or more glycidyl esters of aliphatic saturated monocarboxylic acids branched in α-position.

8. Process according to claim 6, characterised in that a clear lacquer is used which, on production of component A), the monomers b) are used in a quantity of 20 to 70 wt. %, the monomers of component c) are used in a quantity of 10 to 60 wt. %, the monomers of component d) are used in a quantity of up to 20 wt. % and the monomers of component e) are used in a quantity of up to 30 wt. % relative to the weight of all the monomers constituting component A).

9. Process according to claim 6, characterised in that a clear lacquer is used in which component b) comprises acrylic acid esters or acrylic acid and methacrylic acid esters with straight or branched alcohol residues.

10. Process according to claim 9, characterised in that a clear lacquer is used in which component b) comprises acrylic acid esters or acrylic acid and methacrylic acid esters with 2 to 8 C atoms in the alcohol residue.

11. Process according to claim 6, characterised in that a clear lacquer is used in which component c) comprises hydroxyalkylesters of acrylic acid or acrylic and methacrylic acid.

12. Process according to claim 6, characterised in that a clear lacquer is used in which component c) comprises hydroxyalkyl esters of acrylic acid or acrylic and methacrylic acid with 2 to 8 C atoms in the hydroxyalkyl residue.

13. Process according to claim 6, characterised in that a clear lacquer is used in which component d) is acrylic acid or methacrylic acid.

14. Process according to claim 6, characterised in that a clear lacquer is used in which component e) comprises monovinyl aromatic compounds with 8 to 9 C atoms per molecule.

15. Process according to claim 1, characterised in that a clear lacquer is used in which the copolymer containing hydroxyl groups has an OH value of 80 to 200 mg KOH/g and an acid value of 5 to 80 mg KOH/g.

16. Process according to claim 1, characterised in that a clear lacquer is used in which the copolymer containing hydroxyl groups has a weight average molecular weight ($M_w$) of 2,000 to 10,000.

17. Process according to claim 1, characterised in that a clear lacquer is used in which the polyisocyanates B) are aliphatically based polyisocyanates.

18. Process according to claim 1, characterized in that a clear lacquer is used in which the polyisocyanates B) are sterically hindered polyisocyanates.

19. Process according to claim 1, characterised in that the base lacquer layer is based on polyurethane resins, polyester resins or polyacrylates.

20. Process according to claim 1, characterised in that the base lacquer layer comprises a binder based on 50 to 90 wt.

% of one or more polyurethanes containing carbonate groups with a number average molecular weight ($M_n$) of 70,000 to 500,000 in the form of an aqueous dispersion, and 10 to 50 wt. % of one or more polyurethanes with a number average molecular weight ($M_n$) of 20,000 to 60,000 in the form of an aqueous dispersion.

21. Process according to claim 1, characterised in that the base lacquer layer comprises a binder based on 50 to 90 wt. % of one or more polyurethanes containing carbonate groups with a glass transition temperature of below 0° C. in the form of an aqueous dispersion and 10 to 50 wt. % of one or more unsaturated reaction products of carboxy-functional polycondensation products and α, β-olefinically unsaturated monomers with a glass transition temperature of above 0° C. in the form of an aqueous dispersion.

22. Process according to one of claim 1 for preparing an automotive lacquer coating.

\* \* \* \* \*